(12) United States Patent
Bertolini et al.

(10) Patent No.: US 11,920,635 B2
(45) Date of Patent: Mar. 5, 2024

(54) BEARING UNIT

(71) Applicant: AKTIEBOLAGET SKF, Gothenburg (SE)

(72) Inventors: Andrea A. Bertolini, Carrara (IT); Fausto Baracca, Massa (IT); Fabio Cavacece, Rome (IT); Fabio Falaschi, Carrara (IT)

(73) Assignee: AKTIEBOLAGET SKF (SE)

( * ) Notice: Subject to any disclaimer, the term of this patent is extended or adjusted under 35 U.S.C. 154(b) by 0 days.

(21) Appl. No.: 17/873,822

(22) Filed: Jul. 26, 2022

(65) Prior Publication Data

US 2023/0043890 A1 Feb. 9, 2023

(30) Foreign Application Priority Data

Aug. 6, 2021 (IT) .................. 102021000021353

(51) Int. Cl.
*F16C 33/66* (2006.01)
*F16C 33/38* (2006.01)
*F16C 33/78* (2006.01)
*F16C 33/80* (2006.01)

(52) U.S. Cl.
CPC ...... *F16C 33/6629* (2013.01); *F16C 33/3862* (2013.01); *F16C 33/7846* (2013.01); *F16C 33/80* (2013.01)

(58) Field of Classification Search
CPC .... F16C 33/3862–3875; F16C 33/6629; F16C 33/784–785; F16C 33/7856; F16C 33/80
See application file for complete search history.

(56) References Cited

U.S. PATENT DOCUMENTS

| | | | |
|---|---|---|---|
| 3,700,296 A | 10/1972 | Bugmann | |
| 4,428,629 A * | 1/1984 | Colanzi | F16C 33/7823 384/485 |
| 6,402,158 B1 * | 6/2002 | Imazaike | F16C 33/7846 277/549 |
| 2003/0062689 A1 * | 4/2003 | Olsson | F16J 15/3272 277/549 |

FOREIGN PATENT DOCUMENTS

| | | |
|---|---|---|
| EP | 0053334 | 6/1982 |
| JP | 2010121668 | 6/2010 |
| JP | 2012047269 | 3/2012 |

OTHER PUBLICATIONS

Machine Translation of JP 2012047269 (Year: 2012).*
Search Report for corresponding Italy Patent Application No. 102021000021353 dated Apr. 6, 2022.

* cited by examiner

*Primary Examiner* — Alan B Waits
(74) *Attorney, Agent, or Firm* — Reed Smith LLP

(57) ABSTRACT

A bearing unit including a radially outer ring, a radially inner ring, a row of rolling bodies interposed between the radially outer ring and the radially inner ring, a containment cage for keeping the rolling bodies in position defined by a plurality of arched bridges and a plurality of flattened connecting elements interposed between the bridges, a sealing screen interposed between the radially inner ring and the radially outer ring made of composite material provided with an annular central portion having a toroidal surface, a radially inner lug, and a radially outer deflector projecting towards the cage, and a channel between the cage and the sealing screen, axially defined by the lug, the toroidal surface, and the deflector.

20 Claims, 5 Drawing Sheets

Fig. 2 – Det. A

BEARING UNIT

CROSS-REFERENCE RELATED APPLICATIONS

This application is based on and claims priority to Italian Patent Application No. 102021000021353 filed on Aug. 6, 2021, under 35 U.S.C. § 119, the disclosure of which is incorporated by reference herein.

FIELD

The present disclosure relates to bearing units having a sealing device to prevent infiltration of external contaminants into the bearing unit and prevent the loss of lubricant from the bearing unit.

BACKGROUND

Conventional bearing units have very small axial dimensions since they are mounted axially alongside each other, and this dimensional limitation determines the need to resort to particularly sophisticated, or even expensive, technical solutions as regards the choice of the respective components which, despite having smaller axial dimensions, must nevertheless ensure an optimum performance. This can be particularly true in the manufacturing industry and especially in applications in the marble cutting industry.

BRIEF DESCRIPTION OF THE DRAWINGS

The disclosure will now be described with reference to the attached drawings which illustrate non-limiting exemplary embodiments of a bearing unit, in which.

DETAILED DESCRIPTION

Figure 1:
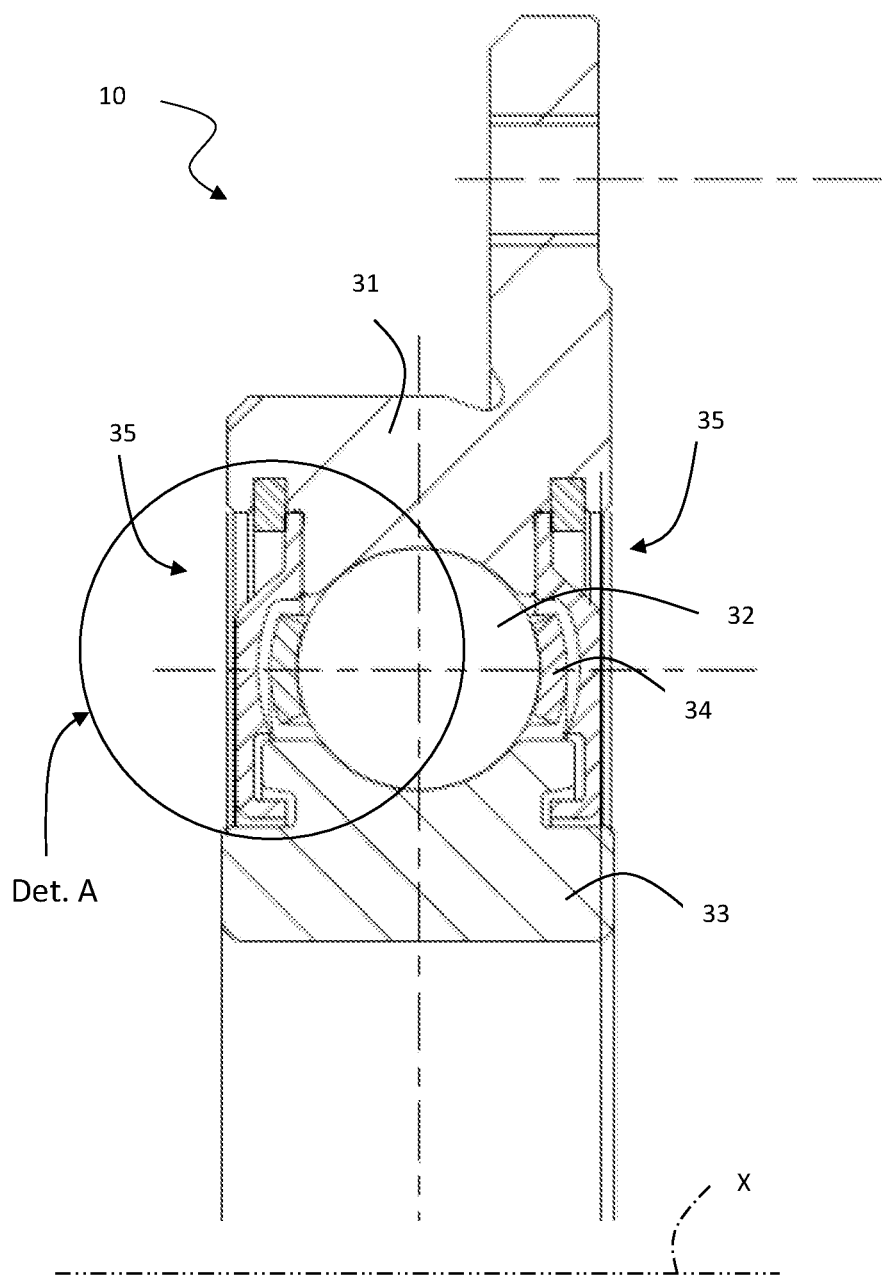
FIG. 1. is a cross-sectional view of a bearing unit according to exemplary embodiments of the present disclosure.

Bearing units generally have a first component, for example a radially outer ring, fixed to a rotating element, and a second component, for example a radially inner ring, fixed to a stationary element. As is known, it frequently happens that the radially inner ring is rotatable, while the radially outer ring is stationary, while in other applications, such as that described, it happens that the outer ring rotates and the inner ring is stationary. In any case, in the bearing unit, the rotation of one ring with respect to the other ring is facilitated by a plurality of rolling bodies positioned between a cylindrical surface of the first component and a cylindrical surface of the second component, e.g., raceways. The rolling bodies may be balls, cylindrical or tapered rollers, needle rollers, and similar rolling bodies.

Bearing units may further have sealing devices for protection against external contaminants and for providing a seal to contain lubricating grease inside the bearing units. Typically these sealing devices consist of a shaped screen mounted by means of interference in a seat of inner and outer rings of the bearing unit and are made of metallic or plastic material, for example PTFE. These sealing devices help ensure an optimum performance both from a functional point of view and in terms of reliability during a whole working life of the bearing unit. A reliable sealing device must not deteriorate over time and must remain within the seats, otherwise functionality may be lost.

In view of the small axial dimensions of these bearing units, the associated sealing devices must also comply with this strict rule of having respective axial dimensions which are decidedly small, such that both the design of the sealing devices and the assembly and anchoring thereof with the bearing rings are subject to extreme conditions. Decidedly small axial dimensions means, in terms of design, having to resort to thicknesses for the component parts at the limit of the structural strength of said parts and at the limit of their capacity to interact with other elements of the bearing unit, such as, for example, a cage of the rolling bodies and the rolling bodies. Since a lubricating grease is arranged inside the bearing unit to allow these bearing units to operate at high speeds of rotation, all the aforementioned limitations may result in deformation or dislodging of the sealing devices, resulting in accidental leakage of grease and a reduction of the working life of the bearing unit.

This problem is further accentuated in applications in which the radially outer ring rotates, as the lubricating grease is subject to high centrifugal forces, which tend to draw the lubricating grease out of the bearing unit.

Finally, known bearing units are axially thin, but have relatively large diameters, increasing oscillation/fluttering with respect to planes transverse to the axis of rotation of the bearing unit. Such oscillation exacerbates the effects of slight movements of the bearing unit on the loss of lubricating grease from the bearing unit.

It is therefore an object of the present disclosure to provide a bearing unit without the aforementioned drawbacks.

A bearing unit 10 may include a radially inner ring 33, a radially outer ring 31, a row of rolling bodies 32, e.g., balls or rollers, interposed between radially outer ring 31 and radially inner ring 33 to allow relative rotation thereof, and a cage 34 for containing rolling bodies of row of rolling bodies 32 in position. In various embodiments, radially outer ring 31 may be configured to rotate and radially inner ring 33 may be configured to be stationary. In alternative embodiments, radially outer ring 31 may be configured to be stationary and radially inner ring 33 may be configured to rotate.

Throughout the present disclosure and in the claims, terms and expressions indicating positions and orientations, such as "radial" and "axial" are understood as being in relation to an axis of rotation X of bearing unit 10.

For simplicity of illustration, reference number 32 refers to a single rolling body, multiple rolling bodies, and to a row of rolling bodies.

In various embodiments a cage 34 may be defined by two identical annular bodies 341 (described throughout as a first annular body 341 and a second annular body 341) mounted in a mirror arrangement with respect to each other. Each annular body 341 may include a plurality of arched bridges 342 and a plurality of flattened connecting elements 343 alternating with the plurality of arched bridges 342 and connecting arched bridges 342. Annular bodies 341 may be connected together in a connection region of connecting elements 343 so that arched bridges 342 of first body 341 may form seats 344 with arched bridges 342 of second body 341 for containing rolling bodies 32. First annular body 341 may be laterally delimited on a side opposite second other body 341, i.e., on an outside, by a shaped surface 345. In the connection region of connecting elements 343, shaped surfaces 345 may be flat and lie in a plane transverse to axis X. In a region of bridges 342, shaped surfaces 345 may have a double curvature: a first circumferential curvature Cc having a center of curvature lying in an intermediate plane of symmetry of cage 34 and a second axial curvature Ca having a center of curvature lying in a cylindrical plane centered on axis X and passing through a center of rotation of rolling bodies 32 housed inside seats 344.

In various embodiments, a bearing unit 10 may further be provided with two sealing devices arranged axially on axially opposite sides of bearing unit 10 for sealing bearing unit 10 off from an external environment.

In various embodiments, a sealing device 35 may be interposed between radially inner ring 33 and radially outer ring 31 and include a sealing screen 40 disposed on an axially inner side of bearing unit 10 against a support surface 31' of radially outer ring 31.

Screen 40 may be provided with a radially inner cylindrical portion 41, a radially outer first flange portion 42 stably inserted inside a first seat 50 of radially outer ring 31, an annular central portion 43 axially defined by an axially inner concave toroidal surface 43', a second flange portion 45 configured to connect cylindrical portion 41 and central portion 43, and a connecting portion 46 having a truncated cone shape configured to connect first flange portion 42 to central portion 43.

Screen 40 may therefore form a radially outer axial seal between first flange portion 42 and support surface 31' of radially outer ring 31 and a radially inner labyrinth seal 39 between cylindrical portion 41 and radially inner ring 33. Labyrinth seal 39 is particularly advantageous for preventing entry of contaminants inside bearing unit 10.

In various embodiments, screen 40 may further be provided with a radially inner annular lug 44 projecting towards cage 34 and annular deflector 48 protruding axially inward towards cage 34.

Annular lug 44 and annular deflector 48 may be regarded as defining radial limits of toroidal surface 43', representing essentially radial end parts of central portion 43 of screen 40.

Screen 40 may be kept in a stable position inside first seat 50 by an anchoring element 60. In various embodiments, anchoring element 60 may be an elastic ring made of a metallic material, e.g., a Seeger ring, inserted by means of interference inside a second seat 70 of radially outer ring 31 axially external relative to first seat 50. Anchoring element 60 may be configured to push axially on screen 40 at first flange portion 42 and towards surface 31' of outer ring 31.

In various embodiments, screen 40 may be made of a composite material, e.g., polyurethane, acetal resin POM. Polyurethanes are thermoplastic elastomers which have the characteristics of elastomers within a wide thermal range and, during processing, behave in the manner of a thermoplastic material. They offer excellent mechanical properties, such as wear resistance. In particular, owing to its composition, polyurethane used has excellent frictional properties, a high pressure resistance, and a high hardness. It is in fact an elastomer with a high hardness, while having the flexibility of a polyurethane. The material is therefore perfectly suited for being used as a seal made of composite material which require a high elasticity and superior resilience.

In various embodiments, screen 40 may be made of an acetal resin POM. Polyoxymethylene (POM)—also known as polyacetal or polyformaldehyde—includes a group of thermoplastic materials with high rigidity, low friction, and excellent dimensional stability. Acetal resin POM is a semi-crystalline copolymer of acetal resin with good physical characteristics, low water absorption, and good resistance to chemical agents. It therefore consists of a material having a high rigidity approaching that of a metallic material.

Figure 2:
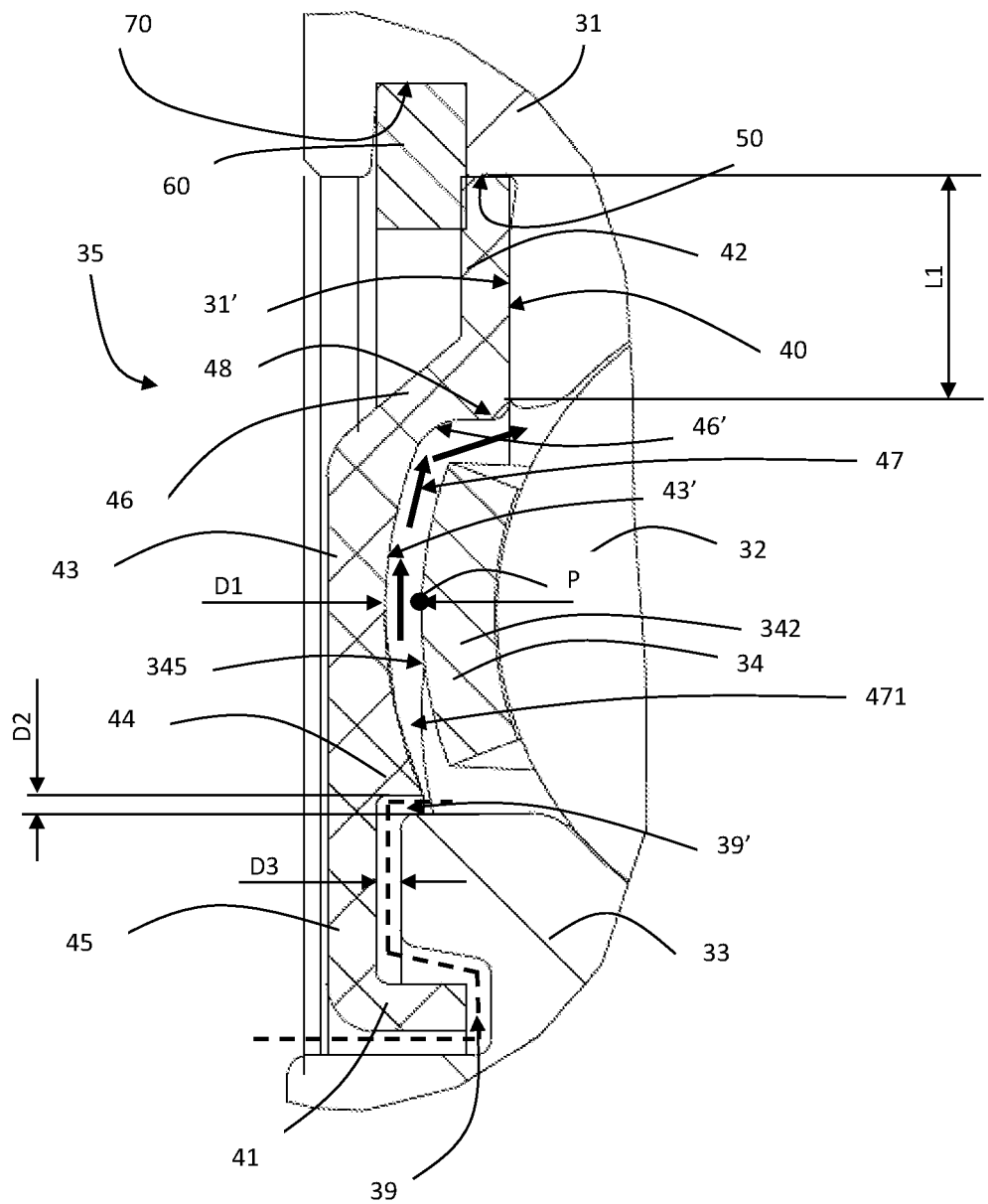
FIG. 2 shows a detail view of the bearing unit of FIG. 1 according to exemplary embodiments of the present disclosure.
Figure 3:
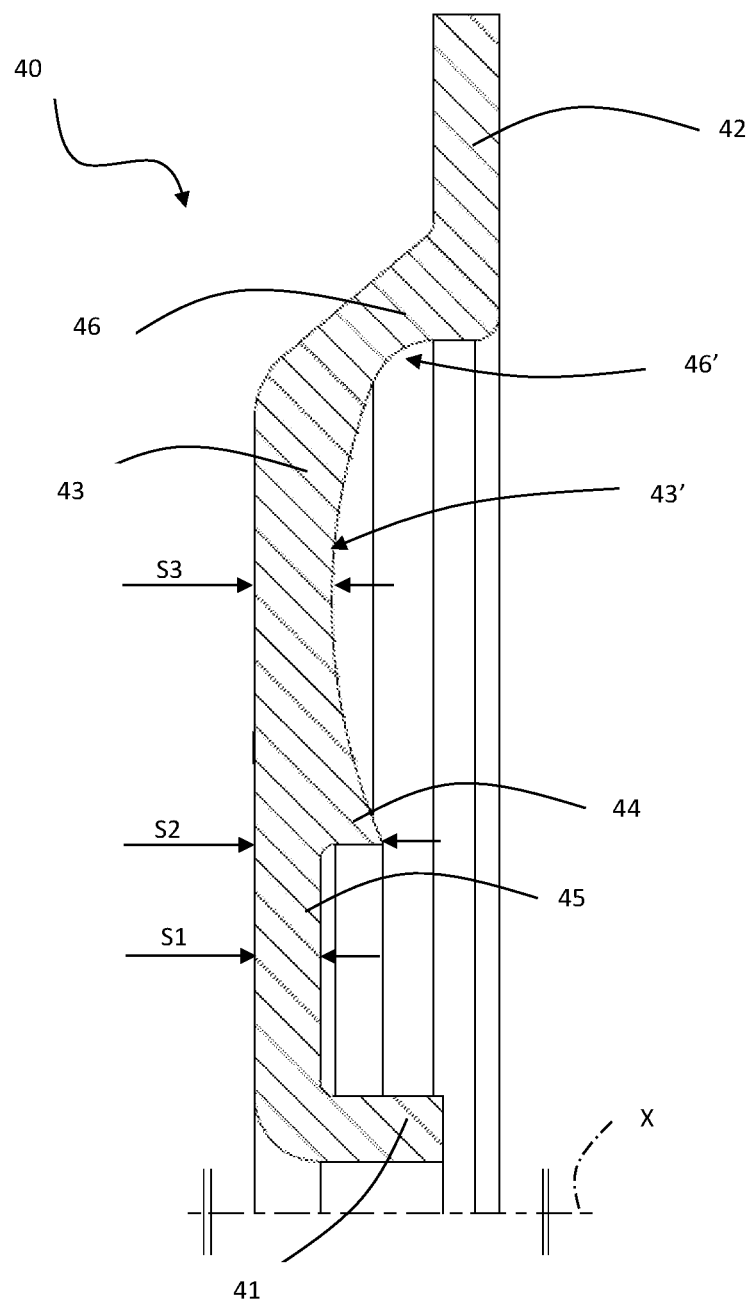
FIG. 3 shows the detail of the bearing unit according to FIG. 2, with parts removed for greater clarity according to exemplary embodiments of the present disclosure.
Figure 4:
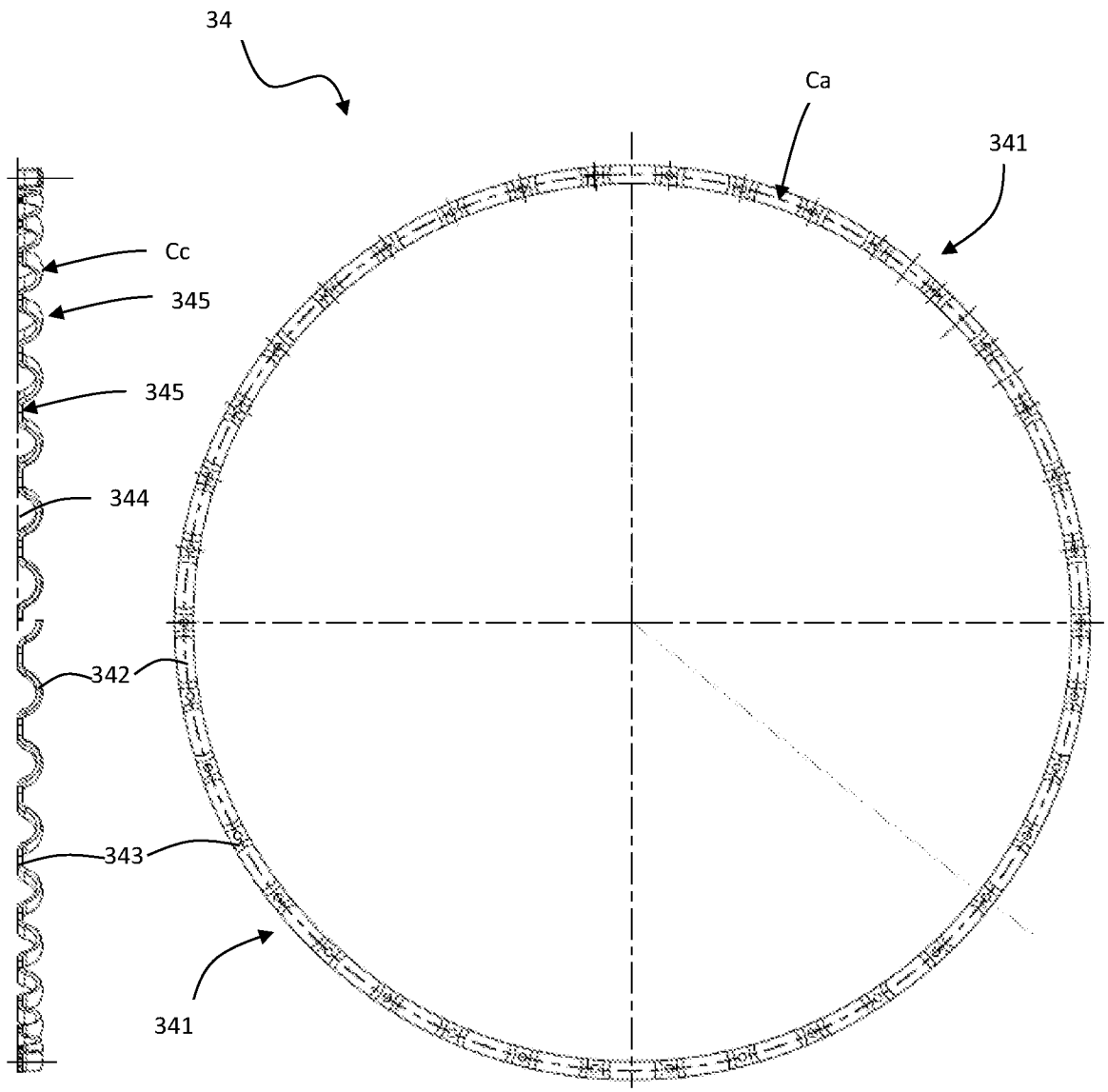
FIG. 4 shows two orthogonal views of a component of the bearing unit of FIG. 1 according to exemplary embodiments of the present disclosure.
Figure 5:
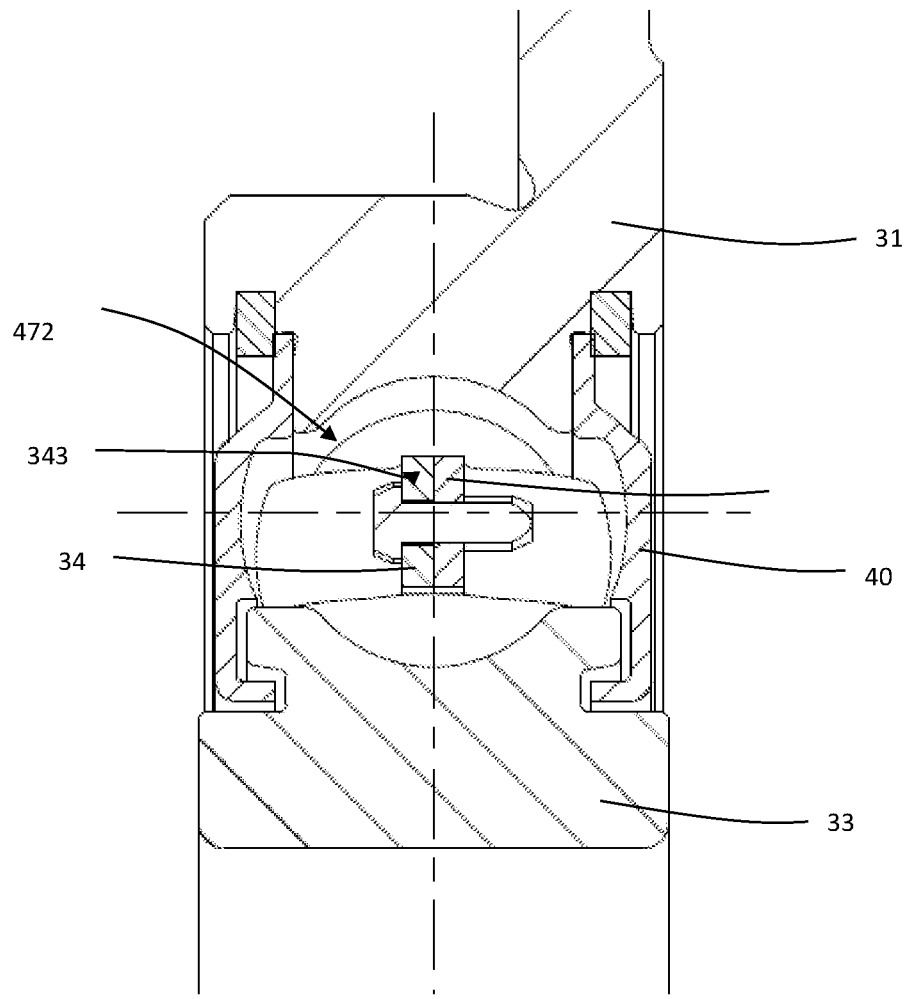
FIG. 5 shows a cross-sectional view of the bearing unit according to FIG. 1.

In various embodiments, screen 40 and surface 345 of cage 34 define between them a channel 47 which has, as shown in FIG. 2, a minimum axial thickness D1 at an apex P of each bridge 342 and a maximum axial thickness D1 in the connecting region of connecting elements 343, as shown in FIG. 5. In various embodiments, a minimum axial thickness D1 is on the order of 0.6 mm.

In various embodiments, channel 47 may be divided into a plurality of gaps 471 defined between screen 40 and each bridge 342 of cage 34 and into a plurality of accumulation volumes 472 defined between screen 40 and each connecting element 343 of cage 34. Gaps 471 and accumulation volumes 472 may alternate circumferentially with each other.

Channel 347, each gap 471, and each accumulation volume 472 may be defined on an axially inner side of bearing unit 10 by cage 34. In various embodiments, shaped surface 345 of cage 34 may define channel 347, gaps 471, and accumulation volumes 472 on an axially inner side of bearing unit 10. Channel 347, gaps 471, and accumulation volumes 472 may be defined on an axially outer side of bearing unit 10 by annular lug 44, toroidal surface 43', and deflector 48.

At each bridge 342, toroidal surface 43' may directly face shaped surface 345. In various embodiments, toroidal surface 43' and shaped surface 345 may have respective radii of curvature substantially identical to each other. In various embodiments, a radius of curvature of toroidal surface 43' and a radius of curvature of shaped surface 345 may be equal to radius of curvature Ca.

In various embodiments, the radius of curvature of toroidal surface 43' and the radius of curvature of shaped surface 345 may be equal to 7.4 mm. A minimum axial thickness D1, in these conditions, may be more or less constant and equal to 0.6 mm along gap 471, creating a labyrinth sealing effect between screen 40 and surface 345 at each bridge 342.

In a region of deflector 48, first flange portion 42 and connecting portion 46 may be connected by a fillet radius 46'. In various embodiments, fillet radius 46' may be 0.8 mm. Connecting first flange portion 42 and connecting portion 46 by a fillet radius 46' provides screen 40 with a more enveloping shape around cage 34, creating deflector 48 and increasing a path which lubricating grease may follow to exit bearing unit 10. By redirecting grease towards cage 34 and rolling bodies 32, deflector helps prevent grease from hitting support surface 31' of screen 40 and infiltrating between screen 40 and support surface 31'.

Due to the geometric flexibility of the composite material, first flange portion 42 may be radially lengthened in various embodiments to extend over all of surface 31', providing a more effective seal. In various embodiments, a contact surface L1 between screen 40 and radially outer ring 31 may be increased by 30%-40% by lengthening first flange portion 42. By way of non-limiting example, contact length L1 may vary between 3 mm and 4 mm (+33%).

The aforementioned combination of characteristics prevents flow of lubricating grease from inside bearing unit 10 to outside bearing unit 10. Moreover, under operating conditions, namely during rotation of bearing unit 10, centrifugal forces cause grease to move from screen 40 in an axially inward direction towards rolling bodies 32, as illustrated by a flow path of grease along gap 471 in FIG. 2. In other words gap 471 formed in accordance with this disclosure facilitates movement of grease in a radially outward and axially inward direction, thus obtaining an improved, repeated lubrication effect.

Similar movement of grease, i.e., in a radially outward and axially inward direction associated with centrifugal forces, is also obtained inside accumulation volumes 472 of channel 47.

By using a screen 40 made of a composite material, cross-sections of varying thicknesses may be obtained. In particular, cross-sections with a greater thickness may reduce fluttering and/or oscillations of screen 40 with respect to planes transverse to axis of rotation X and increase the rigidity of screen 40.

In various embodiments, screen 40 has a greater thickness at central portion 43, in general, and in particular at lug 44. In fact, compared to a thickness S1 of second flange portion 45, a thickness S2 of screen 40 at lug 44 may be more or less twice thickness S1. For example, in a case where thickness S1 is between 0.75 mm and 0.80 mm, thickness S2 may be between 1.5 mm and 1.65 mm. In various embodiments, thickness S1 is substantially identical to a thickness of a shaped screen made of a metallic material.

In various embodiments, a thickness S3 of central portion 43 may be greater than thickness S1 by between 15% and 20%. For example, if S1 is equal to 0.80 mm, thickness S3 may be equal to 0.95 mm (18% greater than the thickness S1). In various embodiments, thickness S3 may be measured from a radially central section of central portion 43.

This additional material due to an increased thickness allows screen 40 to be made more rigid and consequently to obtain an improved planarity when mounted inside a seat of inner ring 33 and/or outer ring 31.

In various embodiments, a thickness of lug 44 increases in a vicinity of a section 39', resulting in a greater overall length of labyrinth 39, thereby improving protection against entry of external contaminants and against leakage of lubricating grease from inside bearing unit 10. Moreover, since a radial play between bearing unit 10 and sealing device 35 is of a smaller order of magnitude than an axial play there between, a radial distance D2 between lug 44 and radially inner ring 33, i.e., section 39' of labyrinth 39, may be smaller than an axial distance D3 between screen 40 at second flange portion 45 and radially inner ring 33 by an amount ranging between 20% and 30%. For example, if axial distance D3 is equal to 0.4 mm, radial distance D2 may assume a value of 0.3 mm, being 25% smaller than axial distance D3.

Decreasing distance D2 results in a reduced probability of lubricating grease ending up inside labyrinth 39 because grease "squashed" between rolling bodies 32 and inner ring 33 tends to invade labyrinth 39. Greater amounts of grease may be guided along plurality of gaps 471, thus increasing lubrication of bearing unit 10 and reducing risk of grease leaking from bearing unit 10.

In addition to the embodiments of the disclosure as described above, it is to be understood that numerous further variants exist. It must also be understood that embodiments described herein are only examples and do not limit the scope of the disclosure, its applications, or possible configurations. On the contrary, although the description provided above enables a person skilled in the art to implement the present disclosure in an exemplary embodiment, it must be understood that numerous variations of the components described are feasible, without thereby departing from the scope of the disclosure, as defined in the accompanying claims, interpreted literally and/or in accordance with their legal equivalents.

We claim:

1. A bearing unit, comprising:
    a radially outer ring configured to rotate about an axis of rotation (X) of the bearing unit;
    a radially inner ring configured to be stationary;
    a row of rolling bodies interposed between the radially outer ring and the radially inner ring;
    a containment cage comprising:
        a plurality of arched bridges, and
        a plurality of flattened connecting elements interposed between each of the plurality of arched bridges; and
    a sealing screen interposed between the radially inner ring and the radially outer ring, the sealing screen comprising an annular central portion, the annular central portion comprising:
        a radially inner lug formed between a first distal end of the sealing screen and a second end of the sealing screen; and
        a radially outer deflector projecting toward the containment cage,
    wherein the radially inner lug and the radially outer deflector define between them a toroidal surface;
    wherein the sealing screen and the cage form a channel axially defined by the annular lug, the toroidal surface of the central portion, and the deflector screen.

2. The bearing unit of claim 1, wherein the channel is divided into a plurality of gaps defined between the screen and each of the plurality of bridges of the cage and into a plurality of accumulation volumes defined between the screen and each connecting element of the cage, each gap of the plurality of gaps circumferentially alternating with a corresponding accumulation volume of the plurality of accumulation volumes.

3. The bearing unit of claim 2, wherein the toroidal surface of the central portion has a radius of curvature substantially equal to an axial radius of curvature (Ca) of a shaped surface of the cage at each bridge of the plurality of bridges.

4. The bearing unit of claim 3, wherein a minimum axial thickness (D1) between the screen and the cage at each gap of the plurality of gaps is equal to 0.6 mm.

5. The bearing unit of claim 4, wherein the central portion of the screen further comprises a remaining portion connecting the radially inner distal end of the screen with the radially inner lug of the central portion, the screen comprises a thickness (S2) at the lug is approximately twice a thickness (S1) of the screen at the remaining portion, and the screen includes a minimum thickness (S3) of the central portion that is greater than the thickness (S1) of the remaining portion of the screen by between 15% and 20%.

6. The bearing unit of claim 5, wherein the screen further comprises:
    a radially external first flange portion, configured to be inserted inside a seat connected to the central portion by means of a connecting portion with a truncated cone shape; and
    a radially internal cylindrical portion distal to the radially external first flange portion connected to the central portion by means of a second flange portion.

7. The bearing unit of claim 6, wherein a radial distance (D2) between the lug and the radially inner ring is less than an axial distance (D3) between the second flange portion and the radially inner ring by between 20% and 30%.

8. The bearing unit of claim 6, wherein the first flange portion extends radially inwards with respect to an axial support surface of the screen axially facing the radially outer ring.

9. The bearing of claim 6, wherein the first flange portion and the connecting portion are connected by a fillet radius in a region of the deflector.

10. The bearing unit of claim 2, wherein the screen further comprises:
   a radially external first flange portion connected to the central portion by means of a connecting portion with a truncated cone shape and configured to be inserted inside a seat of the radially outer ring; and
   a radially internal cylindrical portion distal to the radially external first flange portion connected to the central portion by means of a second flange portion.

11. The bearing unit of claim 1, wherein the toroidal surface of the central portion has a radius of curvature substantially equal to an axial radius of curvature ($C_a$) of a shaped surface of the cage at each bridge.

12. The bearing unit of claim 1, wherein the central portion of the screen further comprises a remaining portion connecting the radially inner distal end of the screen with the radially inner lug of the central portion, the screen comprises a thickness ($S2$) at the lug that is approximately twice a thickness ($S1$) of the screen at the remaining portion, and the screen includes a minimum thickness ($S3$) of the central portion that is greater than the thickness ($S1$) of the remaining portion of the screen by between 15% and 20%.

13. The bearing unit of claim 1, wherein the sealing screen comprises a composite material chosen from the group consisting of polyurethane and polyoxymethylene acetal resin.

14. A bearing unit comprising:
   a radially outer ring configured to rotate about an axis of rotation (X) of the bearing unit;
   a radially inner ring configured to be stationary;
   a row of rolling bodies interposed between the radially outer ring and the radially inner ring;
   a containment cage comprising:
      a plurality of arched bridges, and
      a plurality of flattened connecting elements interposed between the plurality of arched bridges; and
   a sealing screen interposed between the radially inner ring and the radially outer ring, the sealing screen comprising an annular central portion, the annular central portion comprising:
      a radially inner lug; and
      a radially outer deflector projecting toward the containment cage;
   a radially external first flange portion connected to the central portion by means of a connecting portion with a truncated cone shape and configured to be inserted inside a seat of the radially outer ring; and
   a radially internal cylindrical portion distal to the radially external first flange portion connected to the central portion by means of a second flange portion,
   wherein the radially inner lug and the radially outer deflector define between them a toroidal surface;
   wherein the sealing screen and the cage form a channel axially defined by the annular lug, the toroidal surface of the central portion, and the deflector screen.

15. The bearing unit of one of claim 14, wherein the sealing screen comprises composite material chosen from the group consisting of polyurethane and polyoxymethylene acetal resin.

16. The bearing unit of claim 15, wherein the first flange portion extends radially inward with respect to an axial support surface of the screen axially facing the radially outer ring.

17. The bearing unit of claim 15, wherein a radial distance ($D2$) between the lug and the radially inner ring is less than an axial distance ($D3$) between the second flange portion and the radially inner ring by between 20% and 30%.

18. The bearing unit of claim 17, wherein the first flange portion and the connecting portion are connected by a fillet radius in a region of the deflector.

19. The bearing unit of claim 17, wherein the first flange portion extends radially inward with respect to an axial support surface of the screen axially facing the radially outer ring.

20. The bearing unit of claim 19, wherein the first flange portion and the connecting portion are connected by a fillet radius in a region of the deflector.

* * * * *